Figure 1:
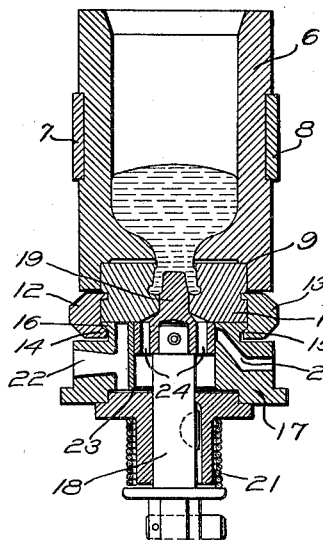

Dec. 8, 1936.                G. E. ROWE                2,063,463
                      METHOD OF MAKING GLASSWARE
                         Filed May 24, 1935

Inventor:
George E. Rowe
by Brown & Parham
Attorneys

Patented Dec. 8, 1936

2,063,463

UNITED STATES PATENT OFFICE 2,063,463

METHOD OF MAKING GLASSWARE

George E. Rowe, Wethersfield, Conn., assignor to Hartford-Empire Company, Hartford, Conn., a corporation of Delaware Application May 24, 1935, Serial No. 23,296

7 Claims. (Cl. 49—80)

This invention relates to methods of making hollow glassware such as bottles, and has particular relation to the methods whereby narrow neck articles are formed in a single mold.

It has been proposed heretofore to form hollow narrow neck glass articles in a single mold by holding the mold in inverted position, delivering a charge to the mold and compacting it therein and in an associated neck mold by pressing or otherwise to form a blank having a neck finish thereon, and thereafter blowing the blank to final form in the mold.

By the use of such a method, the usual blank or parison mold and mechanism for operating it are eliminated, thus materially reducing the initial cost of the forming equipment and the cost of maintenance. This is very desirable because the cost of providing and maintaining the blank molds usually employed is a large item of expense in the manufacture of glassware.

However, there are certain objections to the above-described single-mold method of the prior art. These objections concern defects in the glassware which are caused by localized chilling of the glass and the distortions introduced by compacting the glass in the lower portion of the mold and the blowing or development of the article while the glass remains at all times in contact with the mold.

The general object of the present invention is to provide a novel and improved single-mold method of such character as to reduce the defects of glassware heretofore produced by the single-mold method.

A more specific object of the invention is to provide a novel single-mold method of forming glassware wherein the expansion or development of the glass to form the article is at least partially accomplished out of contact with the mold, to eliminate or reduce local chilling and obtain better distribution of glass in the finished article.

In order that the invention may be fully understood and its advantages appreciated, reference should be had to the accompanying drawing and the description thereof which follows, in which drawing:

Figures 1 to 5 inclusive are views in vertical section of a suitable mold unit and associated devices for the performance of my novel method, and illustrating some of the steps of such method.

In each of the figures, a body mold adapted to impart the final shape to the desired article is indicated at 6, this mold being of the divided type, the sections of which are mounted in holders indicated at 7 and 8 which hold the mold in vertical position at all times.

The mold 6 is recessed at 9 to embrace the neck mold 11 which also is divided into two sections in the usual way. Holders 12 and 13 for the neck mold sections have flanges 14 and 15 which engage a complementary flange 16 on a head 17, whereby when the neck mold is closed, it is held in air-tight engagement with the head.

Figure 3:
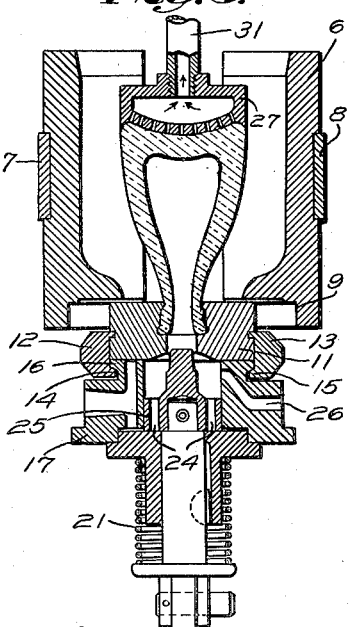
Figure 4:
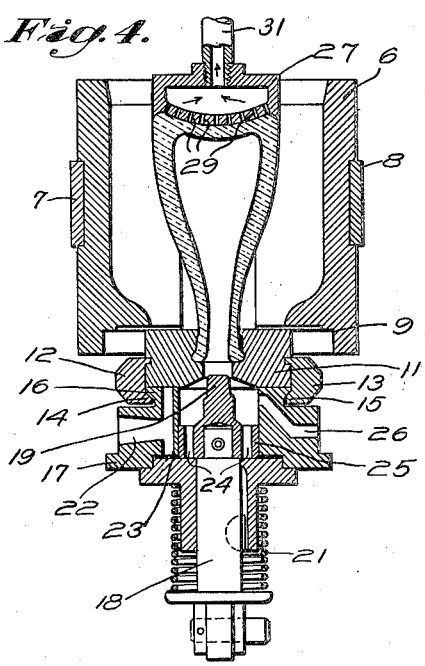
Figure 5:
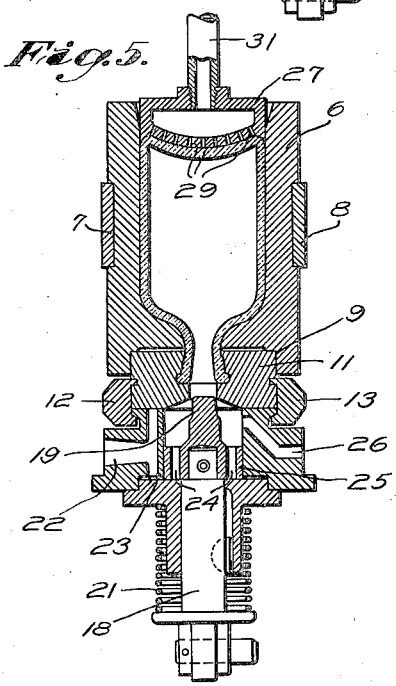

Head 17 contains plunger 18 which carries neck pin 19 and which is urged out of operative position by spring 21. The head 17 has a vacuum port 22 which communicates with the neck mold when the neck pin is seated, through a passage formed at 23, and passages 24 in a collar or slide valve member 25 formed integrally with the neck pin 19. When the neck pin is lowered, however, the passage at 23 is closed by the collar 25, and an air port 26 is opened to admit air to the interior of the neck mold, as shown in Figs. 3, 4 and 5.

It will be understood that suitable mechanisms may be provided for opening and closing the molds, for operating the neck pin and plunger, for controlling the admission of vacuum and air to head 17 and for timing such mechanisms, suitable means for these purposes being old and well known in the art and not constituting parts per se of the present invention.

Cooperating with the mold 6 is a head or closure 27 adapted to fit snugly within and to reciprocate in the mold. This head is hollow as shown, the bottom 28 preferably being shaped according to the final shape of the bottom of the article so produced and having a number of small ports 29 therein too small for the passage of glass but sufficient in size and number for the purposes hereinafter set forth.

The head 27 is carried by a hollow rod 31 by means of which it is raised and lowered. The rod 31 may be connected to a suitable air motor or other power means (not shown) for raising and lowering the head, and vacuum and air pressure may be supplied to the head through the rod in any suitable known manner.

In carrying out the method of the invention, the molds are closed and the neck pin seated and a charge of glass is delivered to the mold, as shown in Fig. 1. The charge may be compacted in the lower part of mold 6 and in the neck mold by the application of vacuum through port 22, by air pressure from above supplied through the head 27 which head is introduced into the mold for this purpose, by pressure of the head on the charge, or by any of these means in combination with one another. It is preferred, however, to employ all such means in the order named. This insures perfect formation of the neck finish and of the blank, which, after the head 27 is lowered or pressed into engagement therewith, may have the shape indicated in Fig. 2. The engagement of head 27 with the glass insures a substantially uniform chilling action over the entire surface of the glass, so that uniform expansion thereof may later be obtained.

After the blank is formed, the air pressure in head 27, if any be used, is disconnected and vacuum applied to the interior thereof. From this time until the article is completed, head 27 acts as a vacuum or suction head. The neck pin 19 is now withdrawn and the mold 6 opened, leaving the blank held in exact vertical position between the neck mold which supports the blank from below and the head 27 which supports the blank from above.

While so supported and while the neck pin is withdrawn and the mold 6 is open, as shown in Figs. 3 and 4, the blank is developed into a hollow parison.

This is accomplished by the admission of air under suitable regulation (by means not shown) and by the elevation of the head 27. However, this development of the hollow parison preferably is not begun until after the blank has reheated sufficiently to eliminate or reduce local chilling.

The elevation of the head and the admission of air may occur simultaneously or at different times, or such operations may be so timed that the development of the hollow parison will occur in definite stages, or as a continuous operation, all depending upon the type of ware being produced.

Fig. 3 illustrates the development of the parison in an intermediate stage, and Fig. 4 shows the head 27 in its uppermost position upon the completion of the formation of the hollow parison.

Upon the completion of the formation of the parison, the mold 6 is closed about the head 27 and the parison blown to its final shape, as shown in Fig. 5, against the head 27 by the admission of air under the proper pressure. If desired, however, head 27 may be removed after the mold has closed, to permit reheating of the bottom of the parison, or may be replaced by another bottom closure of known type (not shown) for the final blowing operation. Also, the neck mold may be opened at any time prior to the final blowing operation for a short period, but while the blowing air is cut off and the glass is supported by head 27, if this should be necessary or desirable.

When the finish blowing operation is completed, the molds are opened and the article removed by head 27 or in any other manner, as desired.

Figure 2:
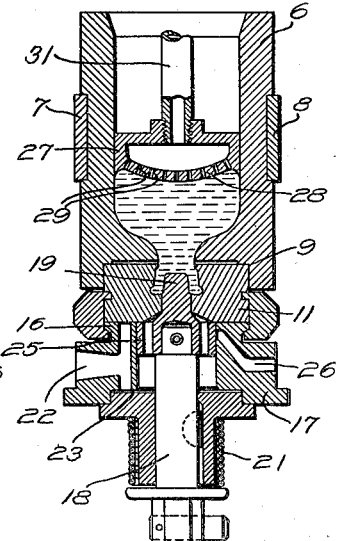

The development of the hollow parison in the manner described above has numerous advantages. It permits reheating of the glass to eliminate local chilling and avoids surface and other defects caused by sliding or rolling of glass on the mold surface. The development of the hollow parison to a form and size closely approximating the finished article also results in much better distribution and a more uniform product, than would be obtained by simply blowing the glass to final form with the mold closed, as shown in Fig. 2. Thus, if the neck pin should be withdrawn in Fig. 2, and the glass blown to final form with the mold closed, the lower wall of the finished article, that is, the part formed in the space above the blank shown in Fig. 2, would consist of hot glass forced from the interior of the blank and the wall of such portion would be relatively thin, while the upper wall and shoulder of the article would consist of the colder and thicker exterior of the blank, resulting in a pronounced wave between the two wall portions thus formed and a heavy shoulder.

On the other hand, in the method of this invention, instead of the chilled exterior of the blank retaining its identity as the upper wall and shoulder, this chilled exterior is extended like an elastic sack by reheating, stretching by the head 27 and blowing to form the exterior of the side wall of the finished article, the hot interior glass being expanded therewith and distributed on the interior of this sack, this substantially reducing or eliminating waviness and other defects and insuring the desired glass distribution.

By comparing Fig. 3 or Fig. 4 with Fig. 2, or Fig. 4 with Fig. 5, it will be observed that the elevation of head 27 in stretching the glass, causes an attenuation or constriction of the glass in the shoulder, and in the vicinity of the shoulder, the amount of attenuation gradually diminishing from the neck to the bottom of the glass where it is held by head 27. This permits the mold 6 to be held closed if desired, or nearly so, during the development of the hollow parison because such attenuating withdraws the glass from, and holds it out of contact with, the mold wall. The desired reheating and development of the parison with a uniform skin formation may thus be obtained in substantially the same way as when the mold is opened relatively wide in the preferred manner shown in Figs. 3 and 4.

In spite of such attenuation, however, the shoulder of the finished article will not be thinner than is desired because the stretching and expansion can be and is so controlled as to be generally distributed and not too localized.

Also, hot interior glass may flow downwardly during or shortly after the development of the hollow parison which insures sufficient thickness of the shoulder in the finished article.

The expression "full length parison" as used herein means a parison which is substantially the full length of the finishing mold in which the parison is blown to final form.

Variations and changes may be made in the apparatus and method described above without departing from the invention as defined in the appended claims.

I claim:
1. The method of forming hollow glassware which comprises, charging an inverted finishing mold and associated neck mold with molten glass, downwardly compacting the charge to form a blank having a neck finish thereon, opening the finishing mold, forming the blank into a hollow parison by expanding said blank upwardly while out of contact with said finishing mold, closing the finishing mold, and blowing the hollow parison to final shape in said finishing mold.

2. The method of forming hollow glassware which comprises, forming a blank in an inverted finishing mold and neck mold, supporting the blank from above by a supporting member, opening the finishing mold, forming the blank into a hollow parison by applying air thereto through the neck mold and by elevating said supporting member, closing the finishing mold about the hollow parison, and blowing the parison to final form in said finishing mold.

3. The method of forming hollow glassware which comprises, pressing a charge of glass in an inverted finishing mold and neck mold by means of a head adapted to fit in said finishing mold to form a blank having a neck finish, applying suction to said head to support the blank from above, opening said finishing mold, forming the blank into a hollow parison by applying air thereto through said neck mold and by raising said head while maintaining the suction on the glass, closing the finishing mold, and blowing the hollow parison to final form in said finishing mold.

4. The method of forming hollow glassware which comprises, compacting a charge of glass in an inverted finishing mold and neck mold to form a blank having a neck finish, opening the finishing mold, developing the blank into a hollow parison by reheating, upward stretching and blowing of the glass out of contact with the finishing mold, closing the finishing mold, and blowing the hollow parison to final form in said finishing mold.

5. The method of forming hollow glassware which comprises, charging an inverted finishing mold and neck mold with molten glass, pressing the charge of glass downwardly by means of a head to form a blank having a neck finish, applying suction to the glass through said head, opening the finishing mold, developing the blank into a hollow parison by reheating, stretching the glass upwardly by said head and applying blowing air to the glass through said neck mold, closing said finishing mold, and blowing the hollow parison to final shape in said finishing mold and against said head.

6. The method of forming a full length hollow parison in inverted position which comprises, compacting a charge of glass in an inverted body mold and a neck mold the combined volume of which is in excess of the volume of the charge, and developing the blank thus formed into a full length parison by attenuating the inverted blank and by applying air to the inverted blank through the neck ring while the glass is out of contact with the body mold.

7. The method of forming an article of glassware in a single mold which comprises, compacting a charge of glass in an inverted finishing mold and neck mold to form a blank, forming the blank into a full length parison while the glass is out of contact with the finishing mold by expanding and attenuating the inverted blank, and blowing the parison to final form in the inverted finishing mold.

GEORGE E. ROWE.